US009843961B2

(12) United States Patent
Wu et al.

(10) Patent No.: US 9,843,961 B2
(45) Date of Patent: Dec. 12, 2017

(54) DATA TRANSMISSION METHOD, ACCESS POINT, RELAY NODE, AND DATA NODE FOR PACKET AGGREGATION (71) Applicant: Huawei Technologies Co., Ltd., Shenzhen, Guangdong (CN)

(72) Inventors: Tianyu Wu, Shenzhen (CN); Chen Chen, Xi'an (CN); Zhiwei Dai, Xi'an (CN); Changle Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 14/465,548

(22) Filed: Aug. 21, 2014

(65) Prior Publication Data

US 2014/0362692 A1 Dec. 11, 2014

Related U.S. Application Data (63) Continuation of application No. PCT/CN2013/071812, filed on Feb. 25, 2013.

(30) Foreign Application Priority Data

Feb. 24, 2012 (CN) .......................... 2012 1 0043424

(51) Int. Cl.
*H04W 4/00* (2009.01)
*H04W 28/02* (2009.01)
*H04W 40/22* (2009.01)
*H04W 40/12* (2009.01)

(52) U.S. Cl.
CPC ....... *H04W 28/0289* (2013.01); *H04W 40/12* (2013.01); *H04W 40/22* (2013.01)

(58) Field of Classification Search
CPC .... H04W 84/12; H04W 72/121; H04W 76/02
See application file for complete search history.

(56) References Cited

U.S. PATENT DOCUMENTS 8,339,948 B2 * 12/2012 Ramprashad .......... H04L 47/10
370/230
2006/0056443 A1 3/2006 Tao et al.
(Continued)

FOREIGN PATENT DOCUMENTS

CN 1753381 A 3/2006
CN 1898912 A 1/2007
(Continued)

OTHER PUBLICATIONS

"Amendment 6: Sub 1 GHz License Exempt Operation", IEEE P802.11ah/D3.0, Oct. 2014, 611 pages.
(Continued)

*Primary Examiner* — Kevin C Harper (57) ABSTRACT

Embodiments of the present invention relate to a data transmission method, an access point, a relay node, and a data node for packet aggregation. The data transmission method for packet aggregation includes: determining an aggregation relay node in a service area, for aggregating a Medium Access Control (MAC) frame that is sent by a data node to an access point (AP) and is forwarded by the aggregation relay node; and receiving an aggregated MAC frame sent by the aggregation relay node, where the aggregated MAC frame is a MAC frame that is sent by the data node and is aggregated by the aggregation relay node. According to the embodiments of the present invention, a relay node is selectively used to aggregate data, so that aggregated packet data quickly reaches a scale for transmission, and the packet data is sent to a destination node within a short time, thereby significantly enhancing quality of service of a delay-sensitive application service.

16 Claims, 4 Drawing Sheets

100

Determine, in a service area, an aggregation relay node, for aggregating a Media Access Control MAC frame that is sent by a data node to an access point AP and is forwarded by the aggregation relay node — 110

Receive an aggregated MAC frame sent by the aggregation relay node, where the aggregated MAC frame is a MAC frame that is sent by the data node and is aggregated by the aggregation relay node — 120

(56) References Cited

U.S. PATENT DOCUMENTS

| | | | |
|---|---|---|---|
| 2008/0107061 A1 | 5/2008 | Tao et al. | |
| 2009/0003261 A1* | 1/2009 | Kim | H04B 7/2606 |
| | | | 370/315 |
| 2009/0028086 A1* | 1/2009 | Tay | H04W 40/22 |
| | | | 370/315 |
| 2009/0086663 A1 | 4/2009 | Ho et al. | |
| 2009/0285192 A1 | 11/2009 | Shiba et al. | |
| 2010/0265872 A1 | 10/2010 | Wu | |
| 2011/0002337 A1 | 1/2011 | Akahane et al. | |
| 2012/0087300 A1* | 4/2012 | Seok | H04W 76/02 |
| | | | 370/315 |
| 2014/0064231 A1* | 3/2014 | Park | H04W 12/06 |
| | | | 370/329 |

FOREIGN PATENT DOCUMENTS

| | | |
|---|---|---|
| CN | 101536433 A | 9/2009 |
| CN | 101873164 A | 10/2010 |
| CN | 102195704 A | 9/2011 |
| WO | WO 2005/112355 A1 | 11/2005 |
| WO | WO 2006/120650 A1 | 11/2006 |
| WO | 2012148061 A1 | 11/2012 |

OTHER PUBLICATIONS

"Amendment 5: Enhancements for Higher Throughput", IEEE Std 802.11n, Oct. 29, 2009, 536 pages.

\* cited by examiner

DATA TRANSMISSION METHOD, ACCESS POINT, RELAY NODE, AND DATA NODE FOR PACKET AGGREGATION

CROSS-REFERENCE TO RELATED APPLICATIONS

This application is a continuation of International Application No. PCT/CN2013/071812, filed on Feb. 25, 2013, which claims priority to Chinese Patent Application No. 201210043424.7, filed on Feb. 24, 2012, both of which are hereby incorporated by reference in their entireties.

TECHNICAL FIELD

Embodiments of the present invention relate to the field of wireless communications, and in particular, to a data transmission method, an access point, a relay node, and a data node for packet aggregation.

BACKGROUND

In an existing standard, although a data rate of a physical layer has significantly increased, an advantage of an increase in the data rate cannot be presented at a MAC layer because of an inherent system overhead of the Media Access Control (Media Access Control, MAC for short) layer. To reduce an impact of an additional overhead, a frame aggregation mechanism is proposed in the existing standard. Essence of the frame aggregation mechanism is that a plurality of data frames shares one MAC frame header, so as to simplify a frame structure and eliminate inter-frame spaces between data frames and contention time, thereby increasing an effective throughput of the MAC layer.

Currently, two aggregation mechanisms are adopted in the standard, that is, Aggregate Medium Access Control (MAC) Service Data Unit (Aggregation-MAC Service Data Unit, A-MSDU for short) and Aggregate Medium Access Control (MAC) Protocol Data Unit (Aggregation-MAC Protocol Data Unit, A-MPDU for short).

A packet aggregation mechanism is adopted in the existing standard, so as to increase a proportion of effective load. However, when a common node aggregates data, the common node needs to wait for a certain time for the aggregated data to reach a certain scale for transmission, which largely increases a delay of the data, and obviously cannot ensure quality of service of a delay-sensitive service. Meanwhile, in a process in which a node aggregates packet data of different applications and sends aggregated packet data to an access point (Access Point, AP for short), it is difficult to ensure sensitive requirements of different applications for a delay. When a common node performs aggregation, energy consumption of the common node is severe. In an existing application scenario, for example, a smart grid, an energy problem of a node is more obvious due to a large size of the network. In a process in which a data node sends aggregated data to a destination node, a problem of conflict and collision caused by a problem of a hidden terminal is also severe.

SUMMARY

Embodiments of the present invention provide a data transmission method for packet aggregation, where a relay node is selectively used to aggregate data, so that aggregated packet data quickly reaches a scale for transmission, and the packet data is sent to a destination node within a short time, thereby significantly enhancing quality of service of a delay-sensitive application service.

According to one aspect, a data transmission method for packet aggregation is provided and includes:
determining an aggregation relay node in a service area, for aggregating a Media Access Control MAC frame that is sent by a data node to an access point AP and is forwarded by the aggregation relay node; and
receiving an aggregated MAC frame sent by the aggregation relay node, where the aggregated MAC frame is a MAC frame that is sent by the data node and is aggregated by the aggregation relay node.

According to another aspect, a transmission method for packet aggregation is provided and includes:
receiving a Media Access Control MAC frame sent by a data node, where the MAC frame includes aggregation instruction information used for indicating aggregation of the MAC frame;
aggregating the MAC frame according to the aggregation instruction information in the MAC frame, to form an aggregated MAC frame; and
forwarding the aggregated MAC frame to an access point AP.

According to another aspect, a data transmission method for packet aggregation is provided and includes:
determining an aggregation relay node used for aggregating an uplink MAC frame; and
sending a MAC frame to the aggregation relay node, where the MAC frame includes aggregation instruction information used for indicating aggregation of the MAC frame.

According to another aspect, an access point is provided and includes:
a processing unit, configured to determine an aggregation relay node in a service area, for aggregating a MAC frame that is sent by a data node to an access point AP and is forwarded by the aggregation relay node; and
a receiving unit, configured to receive an aggregated MAC frame sent by the aggregation relay node, where the aggregated MAC frame is a MAC frame that is sent by the data node and is aggregated by the aggregation relay node.

According to another aspect, a relay node is provided and includes:
a receiving unit, configured to receive a Media Access Control MAC frame sent by a data node, where the MAC frame includes aggregation instruction information used for indicating aggregation of the MAC frame;
a processing unit, configured to aggregate the MAC frame according to the aggregation instruction information in the MAC frame, to form an aggregated MAC frame; and
a sending unit, configured to forward the aggregated MAC frame to an access point AP.

According to another aspect, a data node is provided and includes:
a processing unit, configured to determine an aggregation relay node used for aggregating a MAC frame; and
a sending unit, configured to send a MAC frame to the aggregation relay node, where the MAC frame includes aggregation instruction information used for indicating aggregation of the MAC frame.

According to the embodiments of the present invention, a relay node is selectively used to aggregate data, so that aggregated packet data quickly reaches a scale for transmission, and the packet data is sent to a destination node within a short time, thereby significantly enhancing quality of service of a delay-sensitive application service.

Meanwhile, data is aggregated only by the relay node, thereby effectively ensuring that other nodes do not generate energy consumption due to packet aggregation. Because the relay node sends aggregated packet data to a destination node, which is equivalent to that the number of nodes participating in data transmission is reduced, it helps ease a problem of a hidden terminal.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In an actual application scenario, in a wireless local area network WLAN, a node directly sends data to an AP by using one hop in most cases, and therefore, the volume of uplink data is large, and the volume of downlink data is small. In the embodiments of the present invention, packet aggregation is performed only on uplink data, and packet aggregation is performed only on a relay node. An aggregation manner may adopt two aggregation mechanisms: A-MSDU and A-MPDU in an existing standard. A data node may forward, to a relay node, data that requests aggregation, and the relay node sends the data to a destination (for example, an AP) after performing packet aggregation. In this way, an aggregated packet can quickly reach a scale for transmission, and the packet is sent to a destination node within a short time, thereby, to a certain degree, meeting a requirement of different sensitive degrees of an application service for a delay. Meanwhile, packet aggregation is performed by using a relay node, which can ensure that other common nodes, especially a node sensitive to energy, do not generate a problem of energy consumption due to packet aggregation. In addition, the relay node sends the aggregated packet, which is equivalent to that the number of nodes participating in transmission becomes smaller, and in this way, a problem of a hidden terminal can also be eased.

Figure 1:
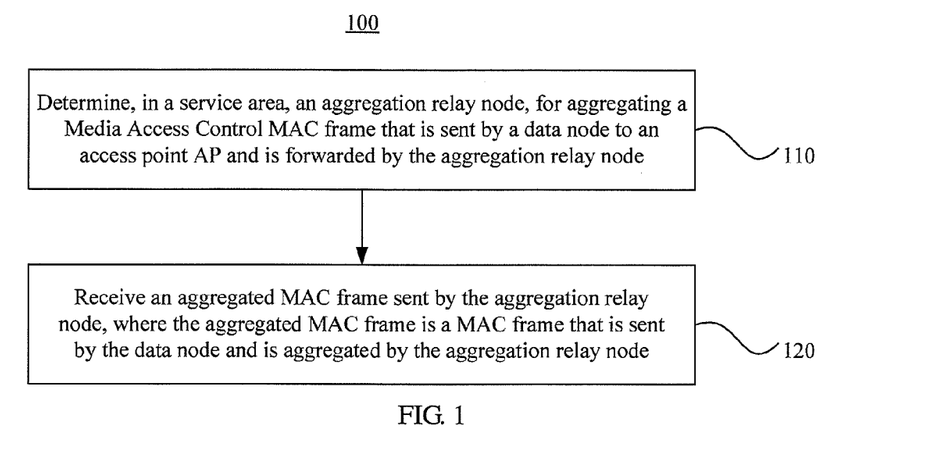
FIG. 1 is a schematic flowchart of a method according to an embodiment of the present invention.

FIG. 1 is a schematic flowchart of a data transmission method 100 for packet aggregation according to an embodiment of the present invention. The method may be applied to a WLAN system, and wireless communication is performed between an access point AP and a user station SAT. As shown in FIG. 1, the method 100 includes:

110. An AP determines, in a service area, an aggregation relay node used for aggregating data, for aggregating a MAC frame that is sent by a data node to the access point AP and is forwarded by the aggregation relay node.

120. The AP receives an aggregated MAC frame sent by the aggregation relay node, where the aggregated MAC frame is a MAC frame that is sent by the data node and is aggregated by the aggregation relay node.

According to the embodiment of the present invention, when the AP determines, in the service area, the aggregation relay node used for aggregating data, the AP sends a first configuration message, such as a broadcast frame, to a pre-selected relay node in the service area according to a preset algorithm, such as, a broadcast frame, where the first configuration message carries aggregation instruction information, and the aggregation instruction information is used for indicating that the pre-selected relay node is used as the aggregation relay node, so as to aggregate the MAC frame that is sent by the data node to the AP and is forwarded by the aggregation relay node.

Alternatively, the AP may also select, according to a preset condition, a part of relay nodes in all relay nodes in the service area as the aggregation relay node, for example, may select a relay node with highest or relatively high strength of a communication signal between the relay node and the AP as the aggregation relay node, so that it can ensure that an aggregated data frame is transmitted to the AP at a relatively high rate. In this way, a sensitive requirement of different application services for a delay can be met, and a throughput of a network can also be enhanced. In this case, the AP may not notify this part of relay nodes.

According to the embodiment of the present invention, the AP may also select an aggregation relay node according to a current network environment. In this case, the AP may send a beacon (beacon) to all relay nodes in the service area; and then the AP receives an acknowledgement frame for the beacon, where the acknowledgement frame is sent by each relay node in all the relay nodes, and the acknowledgement frame carries received signal strength information of each relay node, for example, a received signal strength indication (Received Signal Strength Indication, RSSI for short). The AP may select, according to the received signal strength information of each relay node that is in the acknowledgement frame, one or more relay nodes with maximal received signal strength as the aggregation relay node.

After selecting the aggregation relay node, the AP may notify the data node. According to the embodiment of the present invention, the AP may send a second configuration message to the data node, where the second configuration message carries aggregation relay node instruction information, and the aggregation relay node instruction information is used for instructing the data node to send, to the aggregation relay node, the MAC frame that is sent to the AP and needs to be aggregated. The second configuration message may be a broadcast frame sent by the AP in the service area. The data node learns the aggregation relay node in the service area of the AP after receiving the second configuration message. In a case where there is a plurality of aggregation relay nodes, the data node may select, according to a preset condition, for example, relay node position information, or information of signal strength from the relay node to the data node, or information of a channel condition from the relay node to the data node, one aggregation relay node to relay the MAC frame that is sent by the data node to the AP. For example, the data node may select an aggregation relay node with maximal strength of a communication signal between the aggregation relay node and the data node to aggregate the MAC frame that is sent by the data node to the AP. A person skilled in the art may understand that, aggregation relay nodes selected by different data nodes may be the same, or may also be different. Even though aggregation relay nodes selected by different data nodes are different, aggregated packet data can quickly reach a scale for transmission because the number of relay nodes participating in data aggregation is limited.

According to the embodiment of the present invention, after the AP selects the aggregation relay node, the aggregation relay node itself may notify the data node. In this case, the aggregation relay node may send a configuration message to the data node, for example, a broadcast frame or multicast frame, where the configuration message carries aggregation relay node instruction information, and the aggregation relay node instruction information is used for instructing the data node to send, to the aggregation relay node, the MAC frame that is sent to the AP and needs to be aggregated.

According to the embodiment of the present invention, the aggregation relay node may also be a preset relay node. In this case, the AP does not need to select the aggregation relay node, and the aggregation relay node may send a configuration message to the data node, for example, a broadcast frame or multicast frame, where the configuration message carries aggregation relay node instruction information, and the aggregation relay node instruction information is used for instructing the data node to send, to the aggregation relay node, the MAC frame that is sent to the AP and needs to be aggregated.

After selecting the aggregation relay node used for aggregating the MAC frame that is sent by the data node, the data node may send the MAC frame to the aggregation relay node, and request the aggregation relay node to aggregate data of the MAC frame, and further send the aggregated data to a destination node, where in the embodiment of the present invention, the destination node is an AP. The following describes a communication process between the data node and the aggregation relay node by using an example. In a MAC frame structure in the existing standard, in a parameter Frame Control field, a specific bit combination of Type Subtype, for example, 10 1101, may be used for indicating the MAC frame that is sent to the aggregation relay node and requests aggregation. After receiving such a MAC frame, the aggregation relay node determines, by parsing, that the MAC frame is data that requests aggregation. According to the embodiment of the present invention, a destination address field (Address 1) in such a MAC frame may be assigned with an address of the aggregation relay node. In this way, a sending workstation address field (Address 3) and a receiving workstation address field (Address 4) may be omitted.

At a packet aggregation stage, because destination addresses of uplinks are all APs, that is, destination addresses (DA) of all aggregation subframes are AP addresses, and therefore, DA fields of all aggregation subframes may be removed, and an address of an AP needs to be placed only in a destination address field (Address 1) of an MPDU header part (Header). In this case, a system overhead can be greatly reduced.

The AP sends, according to a condition of receiving data, a block acknowledgement frame to the aggregation relay node for acknowledgement; or the aggregation relay node sends a block acknowledgement request frame to the AP according to a demand, and then the AP performs acknowledgement by using a block acknowledgement frame.

Because a block acknowledgement request and block acknowledgement both occur between the AP and the relay node, at a block acknolwedgement request and block acknowledgement stage, unnecessary overheads may be reduced by optimizing a frame structure. For example, in a structure of an acknowledgement request frame in the existing standard, a corresponding receiving workstation address field (RA) for placing an AP address is omitted, and a sending workstation address (TA) is an address of the aggregation relay node. However, in a structure of a block acknowledgement frame, a corresponding sending workstation address (TA) field for placing an AP address is omitted, and a receiving workstation address (RA) is set to be an address of the aggregation relay node.

To increase packet aggregation efficiency, the service area may be pre-divided into a plurality of groups according to a preset grouping rule, and each group includes a plurality of data nodes and at least one relay node. For a data node in a certain group, one or more relay nodes are selected from the relay nodes in the group as an aggregation relay node, for aggregating an uplink MAC frame that is sent by the data node in the group to the AP.

The following describes the specific application scenario of the embodiment of the present invention by using an example. For example, by using the AP as a center, the service area is uniformly divided into six seamless sectors with equal angles. In this application scenario, the AP may be equipped with an omnidirectional antenna and a fan antenna, and other nodes, including a data node and an intermediate node, are equipped only with an omnidirectional antenna.

At a network initialization stage, the AP sequentially performs polling on the sectors by using a beacon and by using the fan antenna. When the AP performs polling on a certain sector, the beacon includes a sector identifier (Sector ID, SID for short) of the sector. A data node and a relay node that receive the beacon learn sectors in which the data node and the relay node are located. Then all continuously-powered relay nodes send one acknowledgement frame to the AP, and the AP selects some relay nodes with extremely strong communication signals with the AP from these relay nodes as an aggregation relay node of the sector, and then re-sends a configuration message, such as a broadcast frame, to the sector, where the broadcast frame carries aggregation relay node instruction information, and the aggregation relay node instruction information is used for instructing the data node in the sector to send, to the aggregation relay node in the sector group, the MAC frame that is sent to the AP and needs to be aggregated. The AP sequentially performs polling on the six sectors, thereby completing network initialization.

At a stage where the AP serves each sector, the AP sends a broadcast frame to the service area by using the omnidirectional antenna, where the frame carries an inter-frame space, and notifies all sectors that a service can be started, and an aggregation relay node in the sectors needing to be served sends a request to the AP within the inter-frame space by contention. After receiving a service request of the aggregation relay node, the AP determines, according to a preset rule, sequencing information of the aggregation relay node in each sector, and then the AP hands the fan antenna over to a sector with a prior sequence according to the sequencing information; and the aggregation relay node in the sector obtaining the service starts sending the aggregated MAC frame to the AP, where the aggregated MAC frame is a MAC frame that is sent by the data node in the sector and is aggregated by the aggregation relay node in the sector. After the AP ends the service for a certain sector, the AP hands the fan antenna over to a next sector in the sequence, and instructs an aggregation relay node in the sector to send the aggregated MAC frame to the AP.

The above describes the method provided in the embodiments of the present invention from the perspective of an access point. The following further describes the method provided in the embodiments of the present invention from the perspective of a relay node and a data node.

Figure 2:
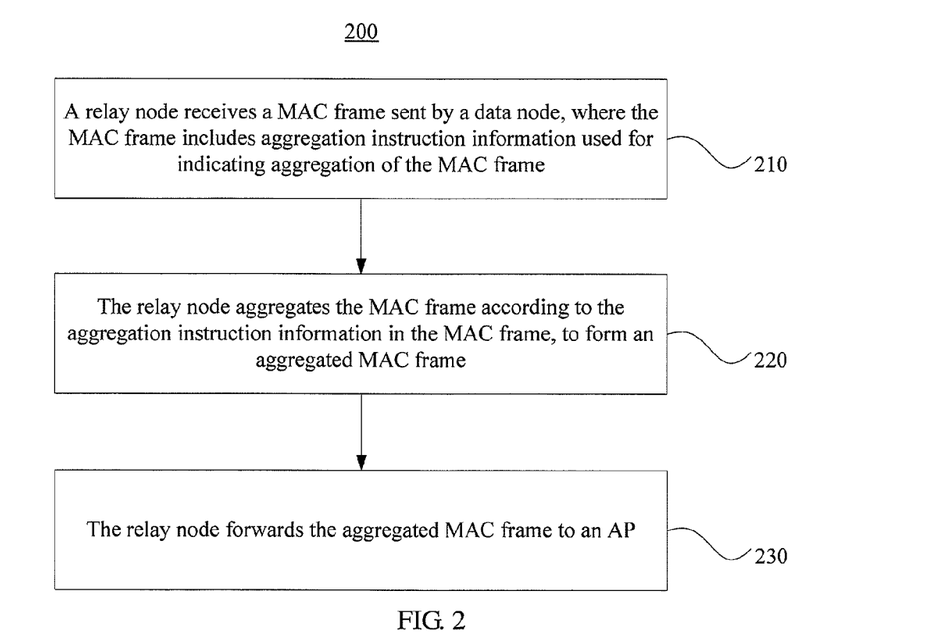
FIG. 2 is a schematic flowchart of a method according to an embodiment of the present invention.

FIG. 2 is a schematic flowchart of a data transmission method 200 for packet aggregation according to an embodiment of the present invention. As shown in FIG. 2, the method 200 includes:

210. A relay node receives a MAC frame sent by a data node, where the MAC frame includes aggregation instruction information used for indicating aggregation of the MAC frame.

220. The relay node aggregates the MAC frame according to the aggregation instruction information in the MAC frame, to form an aggregated MAC frame.

230. The relay node forwards the aggregated MAC frame to an AP.

As described above, according to the embodiment of the present invention, before step 210, the method 200 may include the following step: receiving, by the relay node, a first configuration message sent by the AP, where the first configuration message is used for indicating that the relay node is used as an aggregation relay node, so as to aggregate the MAC frame that is sent by the data node to the AP and is forwarded by the relay node.

Alternatively, as described above, according to the embodiment of the present invention, in a case where the AP selects a relay node as the aggregation relay node, or the aggregation relay node is a preset relay node, before step 210, the method 200 may include the following step: sending, by the aggregation relay node, a second configuration message to the data node, where the second configuration message carries aggregation relay node instruction information, and the aggregation relay node instruction information is used for instructing the data node to send, to the aggregation relay node, the MAC frame that is sent to the AP and needs to be aggregated.

Figure 3:
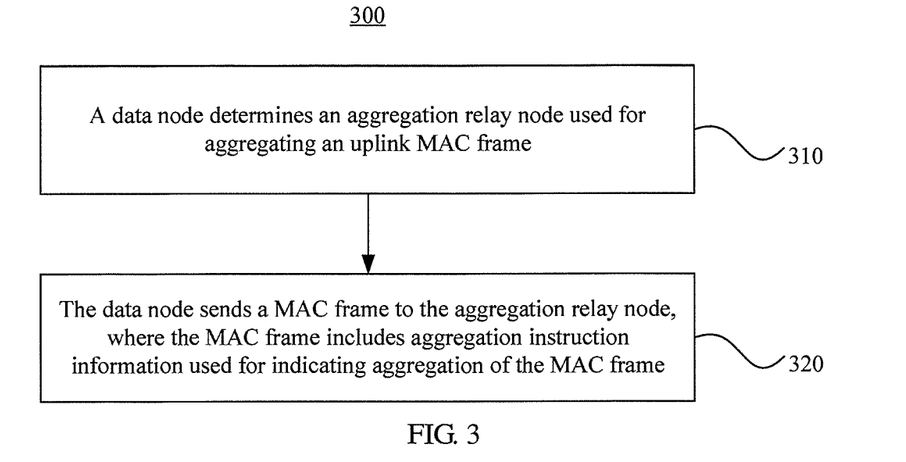
FIG. 3 is a schematic flowchart of a method according to an embodiment of the present invention.

FIG. 3 is a schematic flowchart of a data transmission method 300 for packet aggregation according to an embodiment of the present invention. As shown in FIG. 3, the method 300 includes:

310. A data node determines an aggregation relay node used for aggregating an uplink MAC frame.

320. The data node sends a MAC frame to the aggregation relay node, where the MAC frame includes aggregation instruction information used for indicating aggregation of the MAC frame.

As described above, according to the embodiment of the present invention, the method 300 further includes: receiving, by the data node, a first configuration message sent by an access point AP, where the first configuration message carries aggregation relay node instruction information, and the aggregation relay node instruction message is used for instructing the data node to send, to the aggregation relay node, the MAC frame that is sent to the AP and needs to be aggregated.

As described above, according to the embodiment of the present invention, in a case where there is a plurality of aggregation relay nodes, the method 300 further includes:

selecting, according to a preset condition, one aggregation relay node from the plurality of aggregation relay nodes; and sending a MAC frame to the one aggregation relay node that is selected.

As described above, according to the embodiment of the present invention, in a case where the aggregation relay node notifies the data node, the method 300 includes: receiving, by the data node, a second configuration message sent by the aggregation relay node, where the second configuration message carries aggregation relay node instruction information, and the aggregation relay node instruction information is used for instructing the data node to send, to the aggregation relay node, the MAC frame that is sent to the AP and needs to be aggregated.

As described above, according to the embodiment of the present invention, in a case where there is a plurality of aggregation relay nodes, each second configuration message may carry an RSSI, and the data node selects one of the plurality of aggregation relay nodes according to the RSSI in the second configuration information, for example, selects an aggregation relay node with a maximal RSSI, and then sends a MAC frame to the selected aggregation relay node.

According to the embodiment of the present invention, a relay node is selectively used to aggregate data, so that aggregated packet data quickly reaches a scale for transmission, and the packet data is sent to a destination node within a short time, thereby significantly enhancing quality of service of a delay-sensitive application service.

Meanwhile, only the relay node performs data aggregation, thereby effectively ensuring that other nodes do not generate energy consumption due to packet aggregation. Because the relay node sends aggregated packet data to the destination node, which is equivalent to that the number of nodes participating in data transmission is reduced, it helps ease a problem of a hidden terminal.

According to the embodiment of the present invention, an access point, a relay node and a data node for implementing the data transmission method provided in the embodiments of the present invention are further provided. The access point or relay node or data node may be an access point or a user station STA in a WLAN system.

Figure 4A:
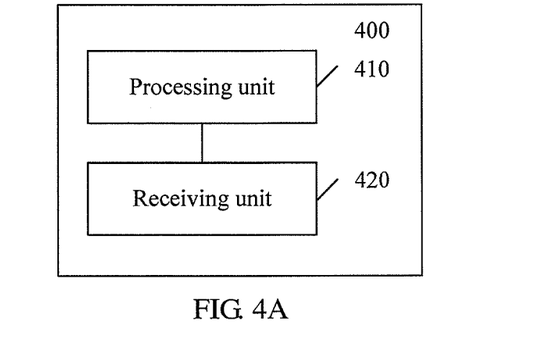
FIG. 4A and FIG. 4B are schematic structural diagrams of an access point according to an embodiment of the present invention.
Figure 4B:
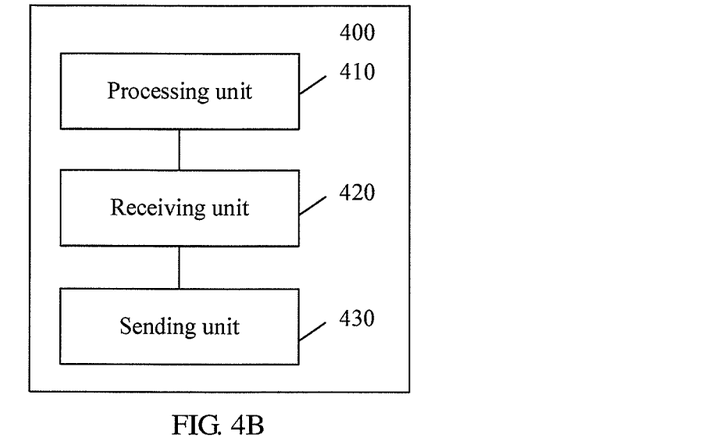

FIG. 4A and FIG. 4B are schematic structural diagrams of an access point 400 according to an embodiment of the present invention. The access point 400 may be used for implementing the AP in the method provided in the embodiments of the present invention. As shown in FIG. 4A, the access point 400 includes:

a processing unit 410, configured to determine, in a service area, an aggregation relay node used for aggregating data, for aggregating a MAC frame that is sent by a data node to an access point AP and is forwarded by the aggregation relay node; and a receiving unit 420, configured to receive an aggregated MAC frame sent by the aggregation relay node, where the aggregated MAC frame is a MAC frame that is sent by the data node and is aggregated by the aggregation relay node.

According to the embodiment of the present invention, as shown in FIG. 4B, the processing unit 410 pre-selects a relay node. The access point 400 further includes a sending unit 430, configured to send a first configuration message to the relay node that is pre-selected by the processing unit in the service area, where the first configuration message carries aggregation instruction information, and the aggregation instruction information is used for indicating that the relay node is used as the aggregation relay node, so as to aggregate the MAC frame that is sent by the data node to the access point AP and is forwarded by the aggregation relay node.

According to the embodiment of the present invention, the processing unit 410 is configured to determine, according to a preset condition, that a part of relay nodes in all relay nodes in the service area are used as the aggregation relay node.

According to the embodiment of the present invention, the sending unit 430 is further configured to send a second configuration message to the data node, where the second configuration message carries aggregation relay node instruction information, and the aggregation relay node instruction information is used for instructing the data node to send, to the aggregation relay node, the MAC frame that is sent to the AP and needs to be aggregated.

According to the embodiment of the present invention, the sending unit 430 is configured to send a beacon to all relay nodes in the service area;

the receiving unit 420 is configured to receive an acknowledgement frame for the beacon, where the acknowledgement frame is sent by each relay node in all the relay nodes, and the acknowledgement frame carries received signal strength information of each relay node; and the processing unit 410 is configured to select, according to the received signal strength information of each relay node that is in the acknowledgement frame, one or more relay nodes with maximal received signal strength as the aggregation relay node.

According to the embodiment of the present invention, the processing unit 410 is further configured to divide the service area into a plurality of groups according to a preset grouping rule, where each group in the plurality of groups includes a plurality of relay nodes and a plurality of data nodes;

the sending unit 430 is configured to send a beacon to the plurality of relay nodes in one specific group in the plurality of groups;

the receiving unit 420 is configured to receive an acknowledgement frame for the beacon, where the acknowledgement frame is sent by the plurality of relay nodes in each group, and the acknowledgement frame carries received signal strength information of the plurality of relay nodes in the one specific group; and the processing unit 410 is configured to select, according to the received signal strength information of the plurality of relay nodes in the one specific group that is in the acknowledgement frame, one or more relay nodes with maximal received signal strength as an aggregation relay node in the one specific group.

According to the embodiment of the present invention, the sending unit 430 is specifically configured to send the second configuration message to the plurality of data nodes in the one specific group, where the second configuration message carries aggregation relay node instruction information, and the aggregation relay node instruction information is used for instructing the plurality of data nodes in the one specific group to send, to the aggregation relay node in the one specific group, the MAC frame that is sent to the AP and needs to be aggregated.

According to the embodiment of the present invention, the receiving unit 420 is specifically configured to receive an aggregated MAC frame sent by the aggregation relay node in the one specific group, where the aggregated MAC frame is a MAC frame that is sent by the plurality of data nodes in the one specific group and is aggregated by the aggregation relay node in the one specific group.

Figure 5:
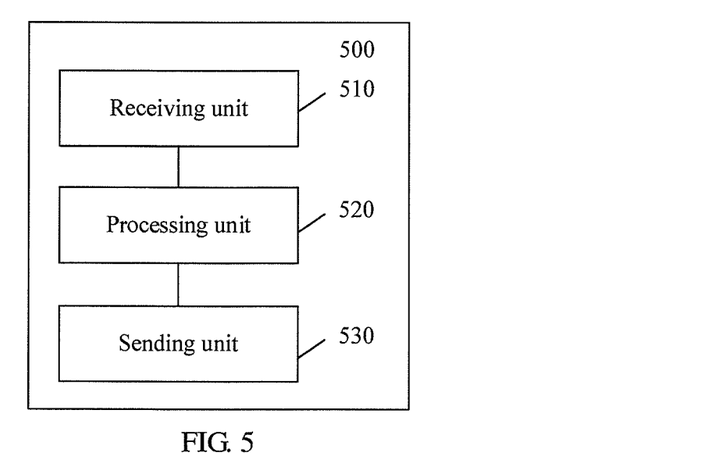
FIG. 5 is a schematic structural diagram of a relay node according to an embodiment of the present invention.

FIG. 5 is a schematic structural diagram of a relay node 500 according to an embodiment of the present invention. The relay node 500 may be used as an aggregation relay node for implementing the method provided in the embodiments of the present invention. As shown in FIG. 5, the relay node 500 includes:

a receiving unit 510, configured to receive a Media Access Control MAC frame sent by a data node, where the MAC frame includes aggregation instruction information used for indicating aggregation of the MAC frame;

a processing unit 520, configured to aggregate the MAC frame according to the aggregation instruction information in the MAC frame, to form an aggregated MAC frame; and a sending unit 530, configured to forward the aggregated MAC frame to an access point AP.

According to the embodiment of the present invention, the receiving unit 510 is configured to receive a first configuration message sent by the AP, where the first configuration message is used for indicating that the relay node is used as an aggregation relay node, so as to aggregate the MAC frame that is sent by the data node to the AP and is forwarded by the relay node.

According to the embodiment of the present invention, the sending unit 530 is configured to send a second configuration message to the data node, where the second configuration message carries aggregation relay node instruction information, and the aggregation relay node instruction information is used for instructing the data node to send, to the aggregation relay node, the MAC frame that is sent to the AP and needs to be aggregated.

Figure 6:
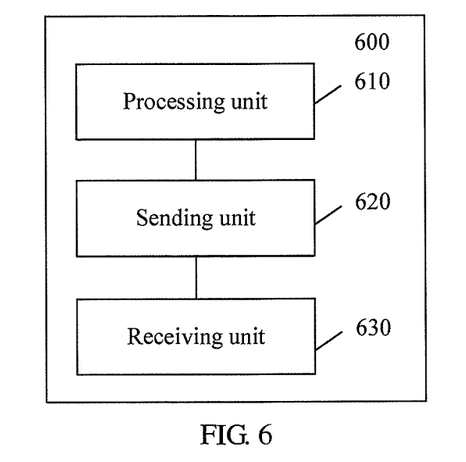
FIG. 6 is a schematic structural diagram of a data node according to an embodiment of the present invention.

FIG. 6 is a schematic structural diagram of a data node 600 according to an embodiment of the present invention. The data node 600 may be used as a data node for implementing the method provided in the embodiments of the present invention. As shown in FIG. 6, the data node 600 includes:

a processing unit 610, configured to determine an aggregation relay node used for aggregating an uplink MAC frame; and a sending unit 620, configured to send a MAC frame to the aggregation relay node, where the MAC frame includes aggregation instruction information used for indicating aggregation of the MAC frame.

According to the embodiment of the present invention, the data node 600 further includes:

a receiving unit 630, configured to receive a first configuration message sent by an access point AP, where the first configuration message carries aggregation relay node instruction information, and the aggregation relay node instruction information is used for instructing the data node to send, to the aggregation relay node, the MAC frame that is sent to the AP and needs to be aggregated.

According to the embodiment of the present invention, in a case where the aggregation relay node includes a plurality of aggregation relay nodes, the processing unit 610 is specifically configured to select, according to a preset condition, one aggregation relay node from the plurality of aggregation relay nodes; and the sending unit is specifically configured to send a MAC frame to the one aggregation relay node that is selected.

According to the embodiment of the present invention, the receiving unit 630 is configured to receive a second configuration message sent by the aggregation relay node, where the second configuration message carries aggregation relay node instruction information, and the aggregation relay node instruction information is used for instructing the data node to send, to the aggregation relay node, the MAC frame that is sent to the AP and needs to be aggregated.

According to the embodiment of the present invention, the receiving unit 630 is configured to receive a plurality of second configuration messages sent by the plurality of aggregation relay nodes, where each of the plurality of second configuration messages carries a receive signal strength indicator (RSSI);

the processing unit 610 is configured to select one aggregation relay node according to the RSSI in the plurality of second configuration messages; and the sending unit 620 is configured to send a MAC frame to the one aggregation relay node that is selected.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more than two units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A data transmission method for packet aggregation, the method comprising:

dividing a service area into a plurality of groups according to a preset grouping rule, wherein each group in the plurality of groups comprises a plurality of relay nodes and a plurality of data nodes;

sending a beacon to the plurality of relay nodes in one specific group in the plurality of groups;

receiving an acknowledgement frame for the beacon, wherein the acknowledgement frame is sent by the plurality of relay nodes in each group, and the acknowledgement frame carries received signal strength information of the plurality of relay nodes in the one specific group;

selecting, according to the received signal strength information of the plurality of relay nodes in the one specific group that is in the acknowledgement frame, a relay node with the maximum received signal strength as an aggregation relay node in the one specific group, wherein the aggregation relay node is selected for aggregating a Medium Access Control (MAC) frame that is sent by a data node to an access point (AP) and is forwarded by the aggregation relay node; and receiving an aggregated MAC frame sent by the aggregation relay node, wherein the aggregated MAC frame is a MAC frame that is sent by the data node and is aggregated by the aggregation relay node.

2. The method according to claim 1, wherein determining, in a service area, an aggregation relay node for aggregating data comprises:

sending a first configuration message to a selected relay node, wherein the first configuration message carries aggregation instruction information, and the aggregation instruction information indicates that the selected relay node is used as the aggregation relay node, so as to aggregate the MAC frame that is sent by the data node to the AP and is forwarded by the aggregation relay node.

3. The method according to claim 2, further comprising:

sending a second configuration message to the data node, wherein the second configuration message carries aggregation relay node instruction information, and the aggregation relay node instruction information is used for instructing the data node to send, to the aggregation relay node, the MAC frame that is sent to the AP and needs to be aggregated.

4. The method according to claim 3, wherein sending a second configuration message to the data node, wherein the second configuration message carries aggregation relay node instruction information, and the aggregation relay node instruction information is used for instructing the data node to send, to the aggregation relay node, the MAC frame that is sent to the AP and needs to be aggregated comprises:

sending the second configuration message to the plurality of data nodes in the one specific group, wherein the second configuration message carries aggregation relay node instruction information, and the aggregation relay node instruction information is used for instructing the plurality of data nodes in the one specific group to send, to the aggregation relay node in the one specific group, the MAC frame that is sent to the AP and needs to be aggregated.

5. The method according to claim 4, wherein receiving an aggregated MAC frame sent by the aggregation relay node, wherein the aggregated MAC frame is a MAC frame that is sent by the data node and is aggregated by the aggregation relay node comprises:

receiving an aggregated MAC frame sent by the aggregation relay node in the one specific group, wherein the aggregated MAC frame is a MAC frame that is sent by the plurality of data nodes in the one specific group and is aggregated by the aggregation relay node in the one specific group.

6. A transmission method for packet aggregation, the method comprising:

receiving a beacon from an access point (AP) in a service area, the service area divided into a plurality of groups according to a preset grouping rule, each group in the plurality of groups comprising a plurality of relay nodes and a plurality of data nodes, the beacon sent to the plurality of relay nodes in one specific group in the plurality of groups;

transmitting received signal strength information to the AP in an acknowledgement frame for the beacon, the received signal strength information configured to be compared by the AP with received signal strength information from the plurality of relay nodes in the one specific group to determine the relay node with the maximum received signal strength and select that relay node as an aggregation relay node;

receiving a Medium Access Control (MAC) frame sent by a data node, wherein the MAC frame comprises aggregation instruction information used for indicating aggregation of the MAC frame;

aggregating the MAC frame according to the aggregation instruction information in the MAC frame, to form an aggregated MAC frame; and forwarding the aggregated MAC frame to the AP.

7. The transmission method according to claim 6, wherein before the receiving a MAC frame sent by a data node, the method further comprises:

receiving a first configuration message sent by the AP, wherein the first configuration message indicates that the relay node is used as the aggregation relay node, so as to aggregate the MAC frame that is sent by the data node to the AP and is forwarded by the relay node.

8. The transmission method according to claim 6, wherein before the receiving a MAC frame sent by a data node, the method further comprises:

sending a second configuration message to the data node, wherein the second configuration message carries relay node instruction information, and the relay node instruction information is used for instructing the data node to send, to the relay node, the MAC frame that is sent to the AP and needs to be aggregated.

9. An access point, comprising:

at least one processor, a receiver, and a transmitter, wherein:
the at least one processor is configured to divide a service area into a plurality of groups according to a preset grouping rule, wherein each group in the plurality of groups comprises a plurality of relay nodes and a plurality of data nodes;
the transmitter is configured to send a beacon to the plurality of relay nodes in one specific group in the plurality of groups;
the receiver is configured to receive an acknowledgement frame for the beacon, wherein the acknowledgement frame is sent by the plurality of relay nodes in each group, and the acknowledgement frame carries received signal strength information of the plurality of relay nodes in the one specific group; and
the at least one processor is configured to select, according to the received signal strength information of the plurality of relay nodes in the one specific group that is in the acknowledgement frame, a relay node with the maximum received signal strength as an aggregation relay node in the one specific group, wherein the aggregation relay node is selected for aggregating a Medium Access Control (MAC) frame that is sent by a data node to an access point (AP) and is forwarded by the aggregation relay node; and
the receiver is configured to receive an aggregated MAC frame sent by the aggregation relay node, wherein the aggregated MAC frame is a MAC frame that is sent by the data node and is aggregated by the aggregation relay node.

10. The access point according to claim 9, wherein:
the transmitter is configured to send a first configuration message to the relay node that is selected by the at least one processor, wherein the first configuration message carries aggregation instruction information, and the aggregation instruction information indicates that the selected relay node is used as the aggregation relay node, so as to aggregate the MAC frame that is sent by the data node to the AP and is forwarded by the aggregation relay node.

11. The access point according to claim 10, wherein:
the transmitter is further configured to send a second configuration message to the data node;
the second configuration message carries aggregation relay node instruction information; and
the aggregation relay node instruction information is used for instructing the data node to send, to the aggregation relay node, the MAC frame that is sent to the AP and needs to be aggregated.

12. The access point according to claim 11, wherein:
the transmitter is configured to send a second configuration message to the plurality of data nodes in the one specific group;
the second configuration message carries aggregation relay node instruction information; and
the aggregation relay node instruction information is used for instructing the plurality of data nodes in the one specific group to send, to the aggregation relay node in the one specific group, the MAC frame that is sent to the access point and needs to be aggregated.

13. The access point according to claim 12, wherein:
the receiver is configured to receive an aggregated MAC frame sent by the aggregation relay node in the one specific group; and
the aggregated MAC frame is a MAC frame that is sent by the plurality of data nodes in the one specific group and is aggregated by the aggregation relay node in the one specific group.

14. A relay node, comprising:
a transmitter, a receiver, and at least one processor, wherein:
the receiver is configured to receive a beacon from an access point (AP) in a service area, the service area divided into a plurality of groups according to a preset grouping rule, each group in the plurality of groups comprising a plurality of relay nodes and a plurality of data nodes, the beacon sent to the plurality of relay nodes in one specific group in the plurality of groups;

the transmitter is configured to transmit received signal strength information to the AP in an acknowledgement frame for the beacon, the received signal strength information configured to be compared by the AP with received signal strength information from the plurality of relay nodes in the one specific group to determine an aggregation relay node, wherein the relay node is selected as the aggregation relay node when the relay node has the maximum received signal strength;

the receiver is configured to receive a Medium Access Control (MAC) frame sent by a data node, wherein the MAC frame comprises aggregation instruction information used for indicating aggregation of the MAC frame;

the at least one processor configured to aggregate the MAC frame according to the aggregation instruction information in the MAC frame, to form an aggregated MAC frame; and the transmitter is further configured to forward the aggregated MAC frame to the AP.

15. The relay node according to claim 14, wherein:

the receiver is configured to receive a first configuration message sent by the AP; and the first configuration message indicates that the relay node is used as an aggregation relay node, so as to aggregate the MAC frame that is sent by the data node to the AP and is forwarded by the relay node.

16. The relay node according to claim 14, wherein:

the transmitter is configured to send a second configuration message to the data node;

the second configuration message carries aggregation relay node instruction information; and the aggregation relay node instruction information is used for instructing the data node to send, to the relay node, the MAC frame that is sent to the AP and needs to be aggregated.

* * * * *